United States Patent Office.

JOHN ALLCOCK JONES, OF MIDDLESBORO'-ON-TEES, GREAT BRITAIN.

Letters Patent No. 63,255, dated March 26, 1867.

IMPROVED NON-CONDUCTING COMPOSITION FOR COVERING BOILERS, ICE-HOUSES, &c., TO IMPEDE THE PASSAGE OF HEAT.

The Schedule referred to in these Letters Patent and making part of the same.

TO WHOM IT MAY CONCERN:

Be it known that I, JOHN ALLCOCK JONES, of Middlesboro'-on-Tees, in the county of York, and Kingdom of Great Britain, have invented certain new and useful Improvements in the Manufacture of Non-Conducting Substances for Impeding the Passage of Heat, of which improvements I hereby declare the following to be a full, clear, and exact description.

The said invention consists in the manufacture of non-conducting substances by the use of peat, turf, bog, or other similar accumulations of vegetable matter, as well as silt, a deposit part vegetable, part earthy, found in various situations, amongst which I may mention the neighborhood of the Tees, where it exists under the top clay, such substances being used, either alone or in combination with other substances, in the manufacture of a non-conducting medium for the purpose of wholly or partially impeding the passage of caloric or heat, and as a covering for steam and water pipes, boilers, heaters, for lining ice-houses, wine-cellars, and other buildings, and for other purposes where a non-conducting material is required or is found advantageous.

In practically carrying out my invention, I proceed as follows: If the substance be intended to be applied in a plastic state, I take peat, turf, bog, or other similar vegetable or partly vegetable and partly earthy matter, such, for example, as "silt," or that deposit, part earthy and part vegetable, which in some districts is found next to and underneath the peat, and use such matter either alone or in conjunction with Portland or Roman cement, oxide of iron, lime, sand, cow hair, gypsum or sulphate of lime, and mineral oil, such, for example, as that distilled from shale, and mix them well together by friction, adding sufficient water or other suitable liquid as is necessary to reduce the mass to a plastic composition. This composition is to be used for the purpose of preventing, or partially preventing, the radiation or passage of caloric or heat. For this purpose I apply it to steam pipes, water pipes, air pipes, boilers, heating vessels, buildings, and generally to all purposes where the impeding of the passage of heat is required. I also use it as a plastic covering or protective coating for metallic and other surfaces.

The following proportions of ingredients, when peat, turf, bog, or silt is used, in combination with other substances, I have found to give a good result: Peat, turf, bog, silt, or a mixture of them in any desired proportion, one hundred pounds; Roman or Portland cement, twenty pounds; oxide of iron, fifteen pounds; lime, ten pounds; sand, ten pounds; cow hair, four pounds; gypsum or sulphate of lime, two pounds; mineral oil, four pounds.

If preferred, the whole of the above ingredients, after the words "peat, turf, bog, or silt," may be omitted, or any one of the ingredients may be omitted, or the relative proportion of each ingredient may be varied, or other ingredients added, as may be desired, the essential feature of my invention being the use of peat, turf, bog, silt, or similar matters, such as coal dust and charcoal dust, for the purpose specified.

This composition, when used in a plastic state, may be applied by hand or by a trowel, in one or more coats, in conjunction with wood or otherwise, according to the nature of the material or of the surface to which it is to be applied. Hay bands may also be used to facilitate the putting on of the composition or material to pipes; and in order to render such hay bands incombustible they may be saturated in lime and water or other calcareous substance.

In some cases I propose to give stability to the non-conducting coating by covering the same with iron wire netting, galvanized or not, or wire-work of other metals, thereby preventing any disintegration of the composition from the action of the weather or other causes, and I coat the whole with tar, paint, or similar material. In lieu of applying peat, turf, bog, or "silt" in a plastic state, as hereinbefore described, it may be used for certain purposes, either alone or in combination with the other ingredients hereinbefore mentioned, in the form of rectangular or other shaped cakes, blocks, or bricks. These cakes, blocks, or bricks will be found useful for lining or building wine-cellars, ice-houses, and other buildings or constructions where the non-conducting property of the material will be found useful and desirable. Solid blocks or cakes, of the beforementioned material, of any shape or size, with or without admixture with the other ingredients hereinbefore mentioned, may also be used for covering cylinders, boilers, heaters, pipes, and vessels, for the purposes specified.

*Claims.*

1. The application and use, for the purpose of impeding the passage of heat or caloric, of peat, turf, bog, silt, or other similar accumulations of vegetable, or partly vegetable and partly earthy matter, either alone or in combination with other ingredients, substantially as hereinbefore described.

2. The moulding of the said material or composition into cakes and bricks, and the subsequent application of the same in that form, for the purpose specified.

In testimony whereof I have signed my name to this specification in the presence of two subscribing witnesses.

JOHN ALLCOCK JONES.

Witnesses:
 JNO. JONES,
 RICHARD DUCKETT.